(12) United States Patent
Langguth et al.

(10) Patent No.: US 9,396,544 B2
(45) Date of Patent: Jul. 19, 2016

(54) SINGLE IMAGE PHOTOMETRIC STEREO FOR COLORED OBJECTS

(71) Applicant: Adobe Systems Incorporated, San Jose, CA (US)

(72) Inventors: Fabian Langguth, Darmstadt (DE); Kalyan Krishna Sunkavalli, San Jose, CA (US); Sunil Hadap, Newark, CA (US)

(73) Assignee: Adobe Systems Corporation, San Jose, CA (US)

( * ) Notice: Subject to any disclaimer, the term of this patent is extended or adjusted under 35 U.S.C. 154(b) by 181 days.

(21) Appl. No.: 14/150,149

(22) Filed: Jan. 8, 2014

(65) Prior Publication Data

US 2015/0193973 A1 Jul. 9, 2015

(51) Int. Cl.
*G06T 7/00* (2006.01)

(52) U.S. Cl.
CPC ..... *G06T 7/0073* (2013.01); *G06T 2207/10024* (2013.01)

(58) Field of Classification Search
None
See application file for complete search history.

(56) References Cited

U.S. PATENT DOCUMENTS

2012/0287247 A1* 11/2012 Stenger .............. H04N 13/0253
348/47

OTHER PUBLICATIONS

Han, Yudeog, Joon-Young Lee, and In So Kweon. "High quality shape from a single rgb-d image under uncalibrated natural illumination." Computer Vision (ICCV), 2013 IEEE International Conference on. IEEE, 2013.*
Belhumeur, P. N., Kriegman, D. J., and Yuille, A. L. 1999. The bas-relief ambiguity. Int. J. Comput. Vision 35, 1 (Nov.), 33-44.
Bousseau, A., Paris, S., and Durand, F. 2009. User assisted intrinsic images. ACM Transactions on Graphics (Proceedings of SIGGRAPH Asia 2009) 28, 5.
Hernandez, C., Vogiatzis, G., and Cipolla, R. 2011. Overcoming shadows in 3-source photometric stereo. Pattern Analysis and Machine Intelligence, IEEE Transactions on 33, 2, 419-426.
Land, E. H., and McCann, J. J. 1971. Lightness and retinex theory. J. Opt. Soc. Am. 61, 1 (Jan), 1-11.

* cited by examiner

*Primary Examiner* — Zhengxi Liu
(74) *Attorney, Agent, or Firm* — Finch & Maloney PLLC

(57) ABSTRACT

Techniques are disclosed for reconstructing the surface geometry of an object using a single image. A computing device is configured to reconstruct a surface for a colored object from a single image using surface integrability as an additional constraint. The image is captured under an illumination of three fixed colored lights that correspond to three color channels, such as red, green and blue (RGB). The RGB image can be separated into three grayscale images, with different lighting for each image, and the geometry can be reconstructed by computing the surface normals of these separate images. Depth can be estimated by integrating the surface normals.

17 Claims, 8 Drawing Sheets
(5 of 8 Drawing Sheet(s) Filed in Color)

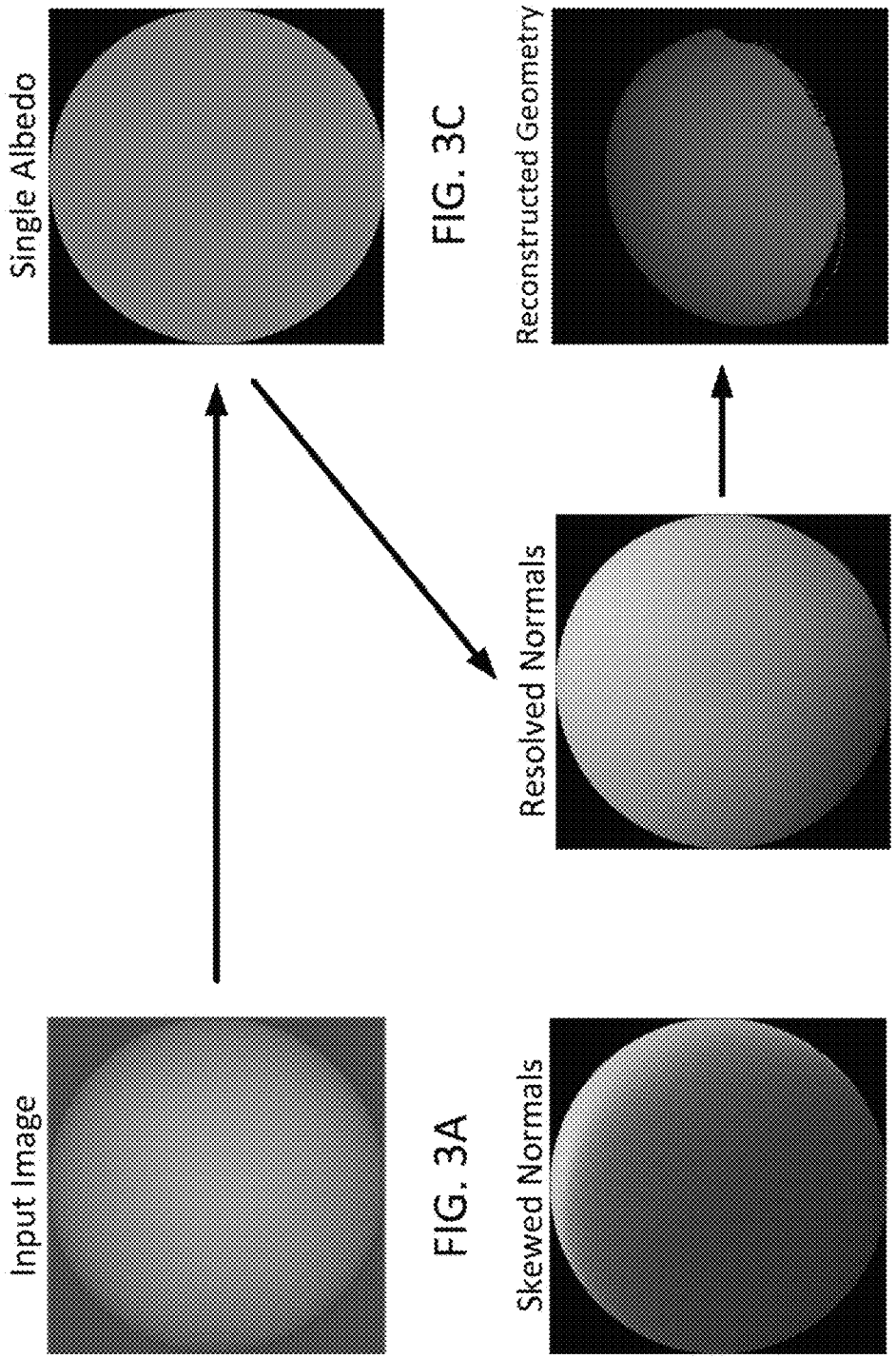

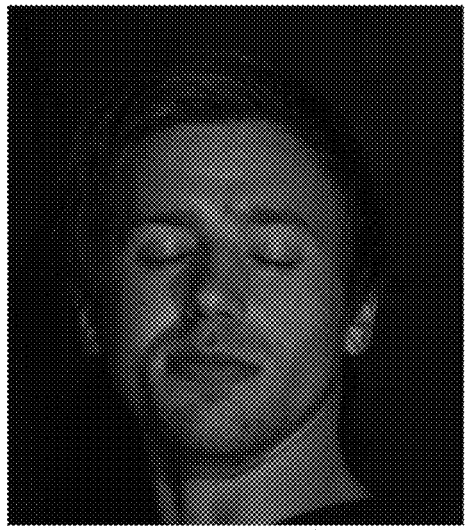
FIG. 4A Input Image
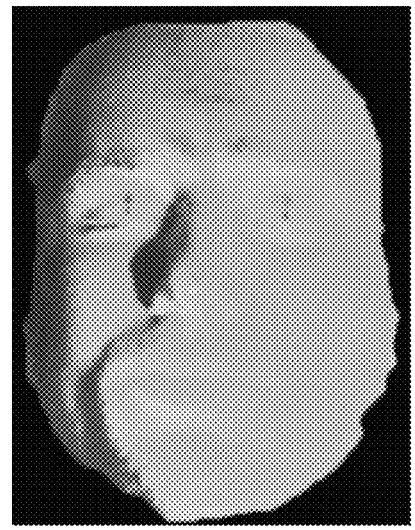
FIG. 4B Skewed Normals
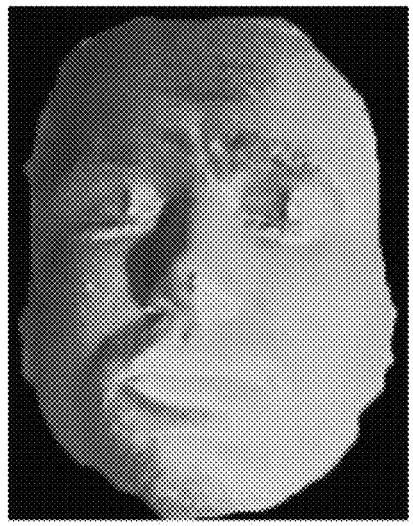
FIG. 4C Resolved Normals
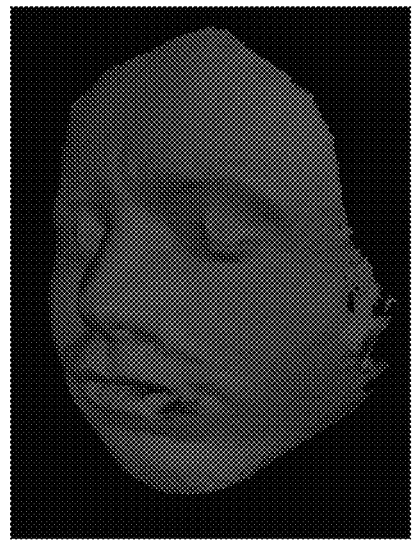
FIG. 4D Reconstructed Geometry

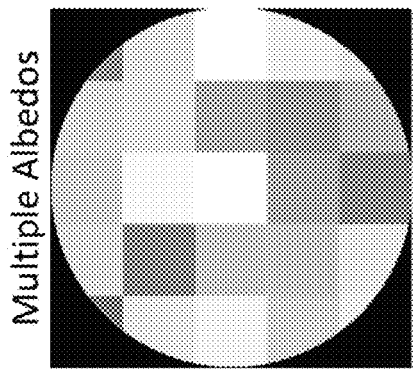
FIG. 5C Multiple Albedos
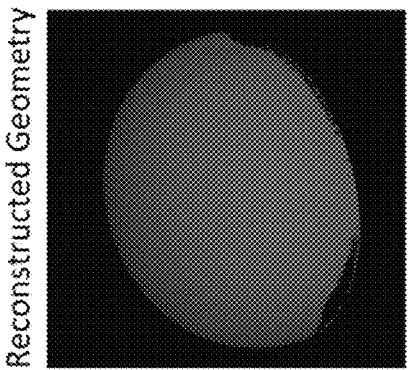
FIG. 5E Reconstructed Geometry
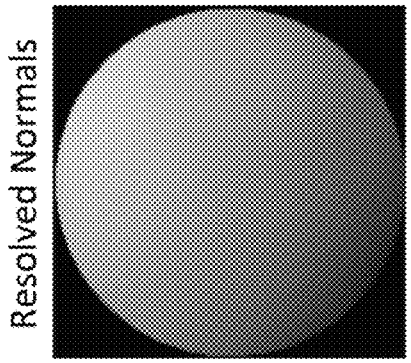
FIG. 5D Resolved Normals
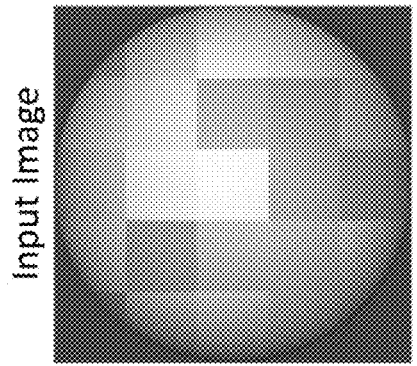
FIG. 5B Skewed Normals
FIG. 5A Input Image

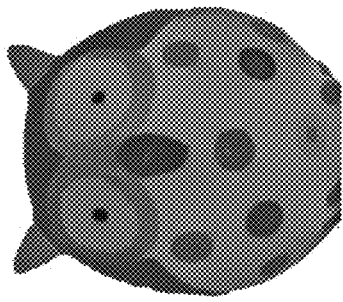
FIG. 6C Retinex Albedos
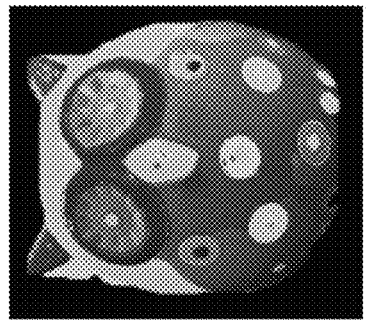
FIG. 6E Resolved Normals
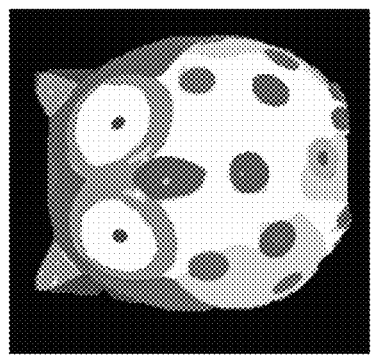
FIG. 6D Albedo clusters
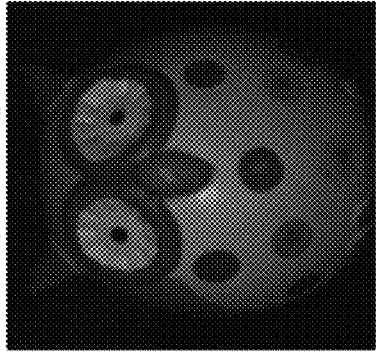
FIG. 6A Input Image
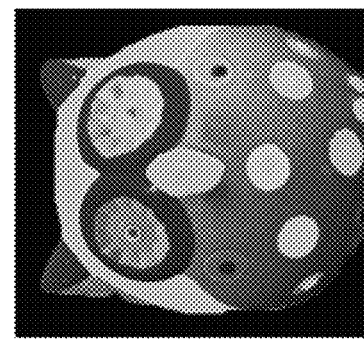
FIG. 6B Skewed Normals

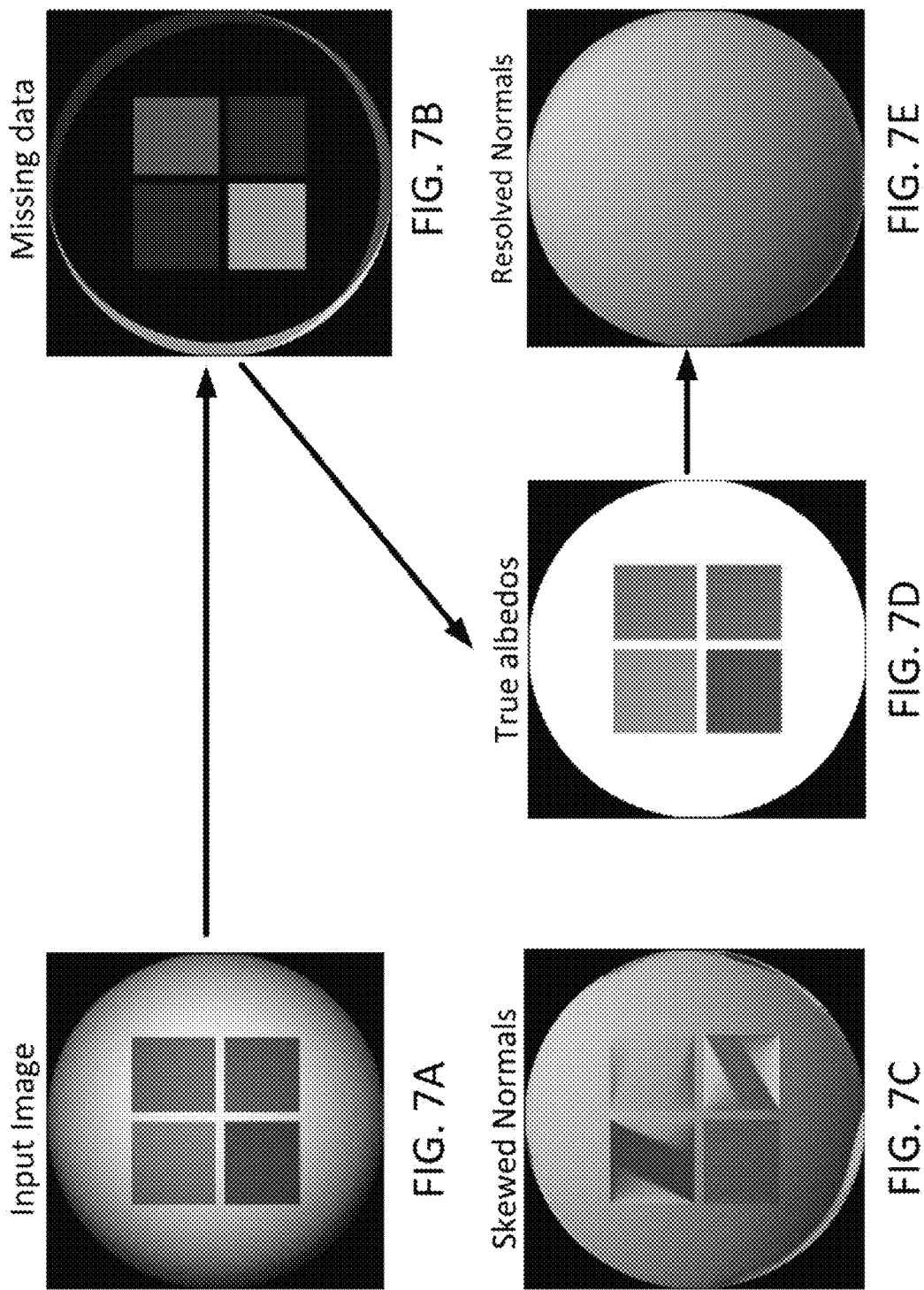

SINGLE IMAGE PHOTOMETRIC STEREO FOR COLORED OBJECTS

FIELD OF THE DISCLOSURE

This disclosure relates to the field of image processing, and more particularly, to techniques for reconstructing the surface geometry of an object using a single image.

BACKGROUND

Photometric stereo is a technique for reconstructing the surface geometry of an object by observing the object under varied lighting conditions. The intensity of the light reflected from the surface of the object can be defined as a function of the orientation of the surface with respect to the observer. Since an image of the surface is one dimensional, it is not possible to determine the geometry, or shape, of the surface using a single image and a single source of illumination. Some photometric stereo techniques can be used to calculate the range or distance between the observer and points on the surface of the object by relating two or more images of the object successively illuminated from different directions, and to reconstruct the geometry of the object by integrating vectors estimated from the calculated ranges. For instance, the direction of illumination incident upon the object can be varied between successive observations of the object from a fixed viewing direction. Since the geometry of the object is unchanging, the effect of varying the direction of incident light is to change the reflectance of a given point on the surface of the object. Such differences in reflectance at each point can provide sufficient information for determining the orientation of the surface at that point, given a constant imaging geometry. Prior solutions assume Lambertian reflectance, in which the apparent brightness of the surface is the same regardless of the viewing angle, and uniform albedo, in which the amount of radiation reflected from the surface as a ratio of the amount of radiation incident upon it is constant across the entire surface. To produce high quality geometries, prior photometric stereo techniques utilize a large number of images of the object, which can be tedious to collect. There remain other issues as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are not intended to be drawn to scale. In the drawings, each identical or nearly identical component that is illustrated in various figures is represented by a like numeral.

FIG. 3A is an example image of a non-white sphere with a single albedo.

FIG. 3B illustrates skewed normals of the sphere of FIG. 3A acquired using a standard photometric stereo technique.

FIG. 3C illustrates a true albedo of the sphere of FIG. 3A acquired using a technique for reconstructing the geometry of an object in accordance with an embodiment of the present invention.

FIG. 3D illustrates resolved normals of the sphere of FIG. 3A acquired using a technique for reconstructing the geometry of an object in accordance with an embodiment of the present invention.

FIG. 3E is a visualization of the geometry of the sphere of FIG. 3A acquired using a technique for reconstructing the geometry of an object in accordance with an embodiment of the present invention.

FIG. 4A is an example image of a human face with multiple albedos.

FIG. 4B illustrates skewed normals of the human face of FIG. 4A acquired using a standard photometric stereo technique.

FIG. 4C illustrates resolved normals of the human face of FIG. 4A acquired using a technique for reconstructing the geometry of an object in accordance with an embodiment of the present invention.

FIG. 4D is a visualization of the geometry of the sphere of FIG. 4A acquired using a technique for reconstructing the geometry of an object in accordance with an embodiment of the present invention.

FIG. 5A is an example image of a sphere painted with twenty-five different albedos and illuminated by separate red, green and blue light sources.

FIG. 5B illustrates skewed normals of the object of FIG. 5A acquired using a standard photometric stereo technique.

FIG. 5C illustrates true albedos of the object of FIG. 5A acquired using a technique for reconstructing the geometry of an object in accordance with an embodiment of the present invention.

FIG. 5D illustrates resolved normals of the object of FIG. 5A acquired using a technique for reconstructing the geometry of an object in accordance with an embodiment of the present invention.

FIG. 5E illustrates a visualization of the geometry of the object of FIG. 5A acquired using a technique for reconstructing the geometry of an object in accordance with an embodiment of the present invention.

FIG. 6A is an example image of a painted owl figure having multiple albedos.

FIG. 6B illustrates skewed normals of the object of FIG. 6A acquired using a standard photometric stereo technique.

FIG. 6C illustrates true albedos of the object of FIG. 6A acquired using a technique for reconstructing the geometry of an object in accordance with an embodiment of the present invention.

FIG. 6D illustrates clusters of albedos of the object of FIG. 6A acquired using a technique for reconstructing the geometry of an object in accordance with an embodiment of the present invention.

FIG. 6E illustrates resolved normals of the object of FIG. 6A acquired using a technique for reconstructing the geometry of an object in accordance with an embodiment of the present invention.

FIG. 7A is an example image of a sphere with shadows and albedos with missing colors.

FIG. 7B illustrates areas of missing data in the image of FIG. 7A.

FIG. 7C illustrates skewed normals of the object of FIG. 7A acquired using a standard photometric stereo technique.

FIG. 7D illustrates true albedos of the object of FIG. 7A acquired using a technique for reconstructing the geometry of an object in accordance with an embodiment of the present invention.

FIG. 7E illustrates resolved normals of the object of FIG. 7A acquired using a technique for reconstructing the geometry of an object in accordance with an embodiment of the present invention.

DETAILED DESCRIPTION

Figure 1:
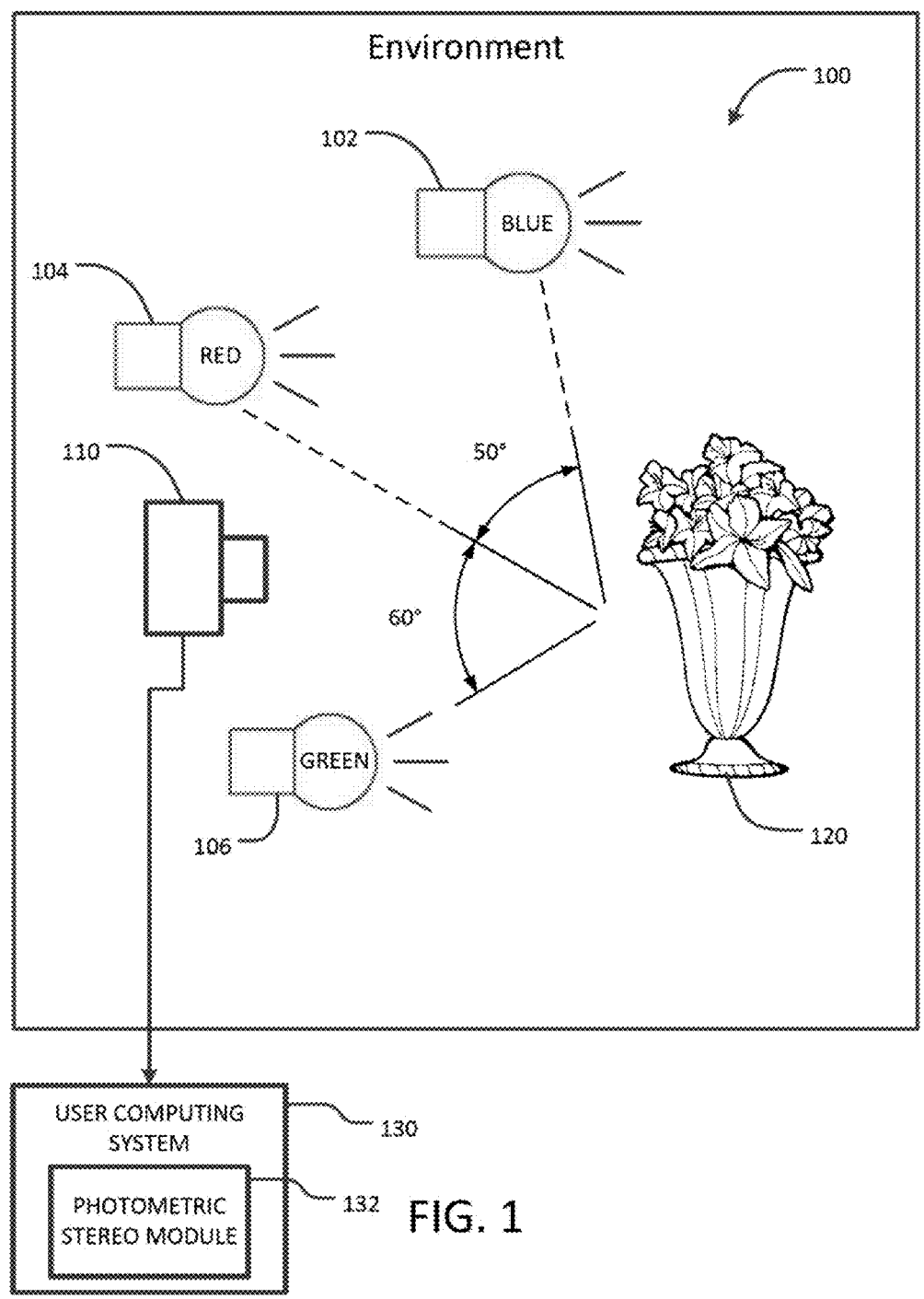
FIG. 1 illustrates an example system for photometric stereo-based geometry acquisition, in accordance with an embodiment of the present invention.

As mentioned above, photometric stereo is a technique for reconstructing the geometry of an object from images of the object acquired under varying lighting conditions. Prior solutions can be limited as previously explained, given the need for a large number of images of the object. In addition, prior solutions assume that an object is white in color and has a uniform albedo, and are incompatible with deforming objects (i.e., objects that change shape), all of which can be significant limitations. However, as will be appreciated in light of this disclosure, it can be desirable to reconstruct the geometry of non-white and multicolored objects using a single image.

To this end, and in accordance with an embodiment of the present invention, techniques are provided for reconstructing the surface geometry of an object that has a non-white surface, a multicolored surface, or both using a single image of the object. The techniques can be implemented, for example, as a computer implemented methodology or an image processing system. For purposes of this disclosure, assume a non-white surface is a surface having any color other than white (e.g., black, gray, blue, green, red, etc.); that is, no portion of the surface is white. Further assume that a multicolored surface is a surface having more than one color (e.g., black portions and white portions, red portions and green portions, blue portions and white portions, etc.). In one example embodiment, the techniques include receiving a single input image of an object illuminated by at least three differently colored light sources, the object having at least one of a non-white surface and a multicolored surface. The single input image is then separated into a plurality of grayscale images each corresponding to a color channel associated with one of the differently colored light sources. A single constant albedo and normal vectors can then be calculated with respect to the surface of the object based on an intensity of pixels and light direction in each of the separate grayscale images. A surface geometry of the object can then be determined based on the calculated albedo and normal vectors. The color channels may include, for example, red, green and blue. In some embodiments, the techniques further include dividing the pixels in each of the separate grayscale images into at least one cluster of pixels having a substantially constant albedo, wherein the calculating of the single constant albedo and the normal vectors is based on the intensity of the at least one cluster of pixels. In some cases, the determining of the surface geometry is constrained by a surface integrability constraint. So, as will be appreciated in light of this disclosure, the techniques can be used to reconstruct a surface for a non-white or multicolored object from a single image using surface integrability as an additional constraint to the nonlinear optimization of an image formation model, which is a two-dimensional geometric representation of a three-dimensional object.

In operation, the image of the object can be acquired, for example, using a camera having at least three color channels, such as a digital camera with red, green and blue (RGB) image sensors. In the image, the object is illuminated using three sources of separable frequencies of light, such as red, green and blue light, or any number of colors using a multi-spectral camera having a corresponding number of color channels. Therefore, each color channel in the image (e.g., red, green and blue) can be treated as separate images having different albedos. The RGB image can be separated into three grayscale images, with different lighting for each image, and the geometry can be reconstructed by computing the surface normals of the separate images. Depth can be estimated by integrating the surface normals. The surface of the object can be reconstructed by measuring the error of the estimated surface normals and applying the error to the solution of the image formation model. As used herein, the term "surface normal," in addition to its plain and ordinary meaning and as will be further appreciated in light of this disclosure, includes an imaginary line or vector that is perpendicular to the surface of an object. Numerous configurations and variations will be apparent in light of this disclosure.

Example Photometric Stereo-Based Geometry Acquisition System

FIG. 1 illustrates an example system for photometric stereo-based geometry acquisition, according to an embodiment. Within an environment 100 are positioned at least three light sources 102, 104, 106, a digital camera 110 and a physical object 120. The object 120 can be illuminated by the light sources 102, 104, 106, and the illuminated scene can be imaged by the camera 110. A user computing system 130 may be operatively coupled to the camera 110. The user computing system 130 may include a photometric stereo module 132 configured to reconstruct the geometry of the surface of the object 120 using the image taken by the camera 110. The light sources can produce different color components, such as red, green and blue. The camera 110 is configured to acquire a color image of the object 120 illuminated by the light sources 102, 104, 106. The light sources 102, 104, 106 can be positioned anywhere relative to the object 120 such that at least some light from each source is reflected from the object 120 to the camera 110. For example, each light source 102, 104, 106 may be located at between approximately 50° and 60° with respect to the object 120 and another light source, although it will be understood that these angles are intended as non-limiting examples. In other words, each light source 102, 104, 106 may be located at any position such that the light sources illuminate the object 120 from different directions. Data representing a single image of the object 120 can be sent from the camera 110 to the user computing system 130. The geometry of the object 120 can then be reconstructed by the photometric stereo module 132 of the user computing system 130 based on the image data, as will be described in further detail with respect to various example embodiments.

Example Methodology

Figure 2:
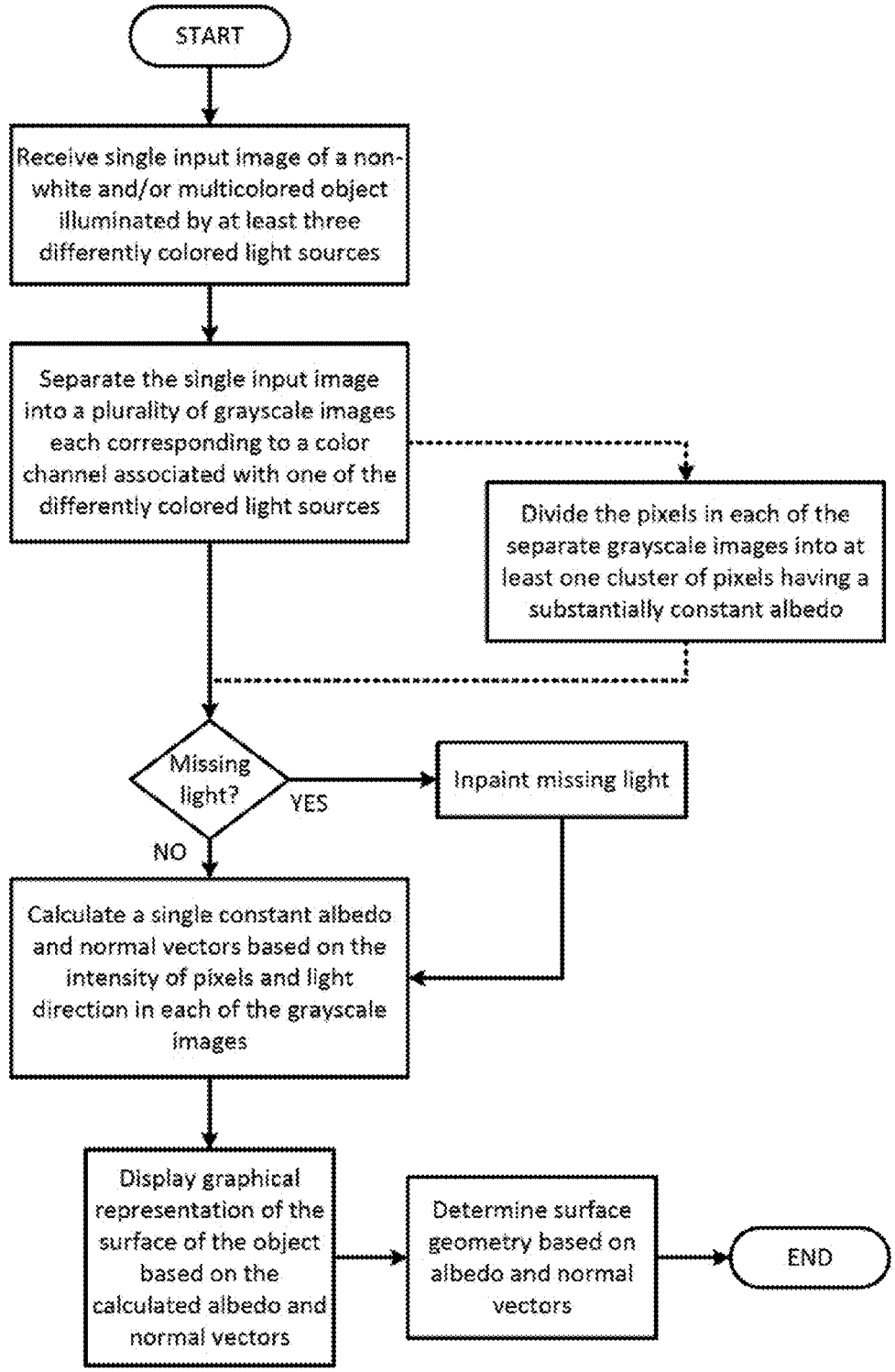
FIG. 2 is a block diagram illustrating an example methodology for reconstructing the geometry of an object in accordance with an embodiment of the present invention.

FIG. 2 shows an example methodology for reconstructing the geometry of an object having a non-white surface, a multicolored surface, or both, in accordance with an embodiment. The method begins by receiving a single input image of the object illuminated by at least three differently colored light sources, such as red, green and blue light sources. The single input image is separated into a plurality of grayscale images. Each of the separate grayscale images corresponds to a color channel associated with one of the differently colored light sources (e.g., red, green and blue). In some embodiments, the pixels in each of the separate grayscale images are divided into one or more clusters of pixels. Each cluster of pixels has a constant or substantially constant albedo; that is, the albedo of each pixel in the cluster is the same or substantially the same as the other pixels in the same cluster. If any region of the single input image is missing light from one of the differently colored light sources (e.g., due to shadows), the missing light can be inpainted into the region(s) (e.g., the missing light can be inserted into the regions with the missing light). Next, a single constant albedo and normal vectors with respect to a surface of the object can be calculated based on the intensity of the pixels or cluster of pixels and the light direction in each of the separate grayscale images. A surface geometry can be determined based on the albedo and normal vectors (e.g., by integrating the normal vectors over the entire surface). In some embodiments, the surface geometry can be calculated using a surface integrability constraint. The surface integrability constraint may, for example, be expressed by the following equation:

$$\frac{\partial}{\partial x}\left(\frac{n_2}{n_3}\right) = \frac{\partial}{\partial y}\left(\frac{n_1}{n_3}\right)$$

where x and y represent pixel coordinate axes, and where $n_1$, $n_2$ and $n_3$ represent surface normal vectors for each of the separate grayscale images, respectively. The method continues by displaying, via a display device, a graphical representation of the surface of the object based on the surface geometry.

Example Results for Images with Non-White or Multiple Albedos

FIGS. 3A through 3E are example images illustrating a technique for reconstructing the geometry of a sphere from a single image, in accordance with an example embodiment. FIG. 3A is an image of a non-white object illuminated by separate red, green and blue light sources. Since some standard photometric stereo techniques cannot estimate an albedo from a single image, such techniques produce skewed normals (assuming a white albedo for this image), as can be seen in FIG. 3B. However, by using an integrability constraint discussed below (e.g., Equation (3)), the true albedo (FIG. 3C) and resolved surface normals (FIG. 3D) can be obtained using an image formation model, and these normals can be integrated to reconstruct the geometry of the object accurately, as illustrated in FIG. 3E.

Assuming Lambertian reflectance, the image formation model can be represented for each pixel x=(x,y) and light direction i as follows:

$$I_{x,i} = a_x(n_x \cdot l_i) \quad (1)$$

where $I_{x,i}$ is the measured intensity of the pixel x, $n_x$ is the (unit) normal at the pixel x, $a_x$ is the albedo, and $l_i$ is the light direction for each image. Each color channel can be treated separately to produce three (or more) equations for a corresponding number of albedos. For example, for three RGB color channels, the different albedos can be represented as:

$$R_x = \begin{bmatrix} a_{x,red} & & \\ & a_{x,green} & \\ & & a_{x,blue} \end{bmatrix}$$

and the different light directions for each color channel can be represented as:

$$L = \begin{bmatrix} l_{red}^T \\ l_{green}^T \\ l_{blue}^T \end{bmatrix}$$

Accordingly, for every pixel x, the image formation model of Equation (1) can be represented as:

$$I_x = R_x L_x n_x \quad (2)$$

To be integrable, as mentioned above, the normals $n = (n_1, n_2, n_3)$ of a surface can be constrained as follows:

$$\frac{\partial}{\partial x}\left(\frac{n_2}{n_3}\right) = \frac{\partial}{\partial y}\left(\frac{n_1}{n_3}\right)$$

which can be expanded to:

$$n_3 \frac{\partial n_2}{\partial x} - n_2 \frac{\partial n_3}{\partial x} = n_3 \frac{\partial n_1}{\partial y} - n_1 \frac{\partial n_3}{\partial y}$$

For a small local pixel neighborhood, a discrete approximation of the preceding constraint can be represented as a linear equation:

$$E(n_{(x,y)}) = n_{(x,y)}^3 (n_{(x+1,y)}^2 - n_{(x,y)}^2) - n^2(n_{(x+1,y)}^3 - n_{(x,y)}^3) - n_{(x,y)}^3 (n_{(x,y+1)}^1 - n_{(x,y)}^1) - n^1(n_{(x+1,y)}^3 - n_{(x,y)}^3) \quad (3)$$

If the albedo is white, $R_x$ becomes the identity matrix and thus the image model can be represented as $n' = L^{-1} I$. For any other albedo matrix R, the transformation of the normals can be modeled by:

$$n' = L^{-1} I = L^{-1} R L n \quad (4)$$

and, accordingly, true normals can be obtained from:

$$n = L R^{-1} L^{-1} n' \quad (5)$$

To solve for $R^{-1}$, albedos in the image may be considered locally constant. For example, this may be true for manmade objects painted with a small amount of different colors. Therefore, the object in the image can be subdivided into small regions with approximately constant albedo to reduce the number of variables that need to be estimated. The surface integrability of the entire surface of the object can be used as a direct error measure on the estimated normals n. This leads to a non-linear optimization problem.

For example, let $\mathcal{R}$ be a set of albedos corresponding to clusters of pixels with a single constant albedo, where $\mathcal{R}_{n_x} \in \mathcal{R}$ is the specific single albedo assigned to $n_x$. Solving simultaneously for all albedos:

$$\underset{\mathcal{R}}{\operatorname{argmin}} \sum_{n_x \in N} E(L R_{n_x}^{-1} L^{-1} n_x')$$

Note that $E(n_x)$ depends on the neighboring normals of $n_x$. The preceding can be further constrained to have unit length as follows:

$$\underset{\mathcal{R}}{\operatorname{argmin}} \sum_{n_x \in N} E(L R_{n_x}^{-1} L^{-1} n_x') + (1 - \|L R_{n_x}^{-1} L^{-1} n_x'\|)^2 \quad (6)$$

FIGS. 4A through 4D are further example images illustrating a technique for reconstructing the geometry of a human face from a single image, in accordance with an example embodiment. FIG. 4A is an image of the face illuminated by separate red, green and blue light sources. Even though the face has multiple albedos (e.g., skin color, eyebrows, lips, etc.), it is largely one albedo (e.g., skin color). Thus, in this case a single albedo can be used to produce better results (FIG. 4C) than some standard photometric stereo techniques, which produce skewed normals (FIG. 4B). There is no ambiguity in the normals estimated using the above equations; that is, there is only one set of normals, n, that satisfy the image formation model for a constant albedo and is integrable, the true surface normals of the object, and the estimated or resolved normals. This can be shown based on the fact that the only transformation of surface normals that retains integrability is the Generalized Bas-Relief (GBR) Ambiguity. Since the albedo of the surface is the same everywhere, the GBR transform can only be an orthonormal matrix, which means that the only ambiguity in the estimated normals is a scale factor. However, since surface normals are unit-vectors, this ambiguity may be resolved, for example, by adding a unit length constraint (as in Equation (6)). FIG. 4D shows the reconstructed geometry for the face based on the resolved normals shown in FIG. 4C.

Example Results for Images with Multiple Albedos

The above-described technique for reconstructing the geometry of an object using a single albedo can be extended to objects with a finite set of albedos as long as clusters of pixels with a single constant albedo can be estimated. In accordance with another example embodiment, an intrinsic image technique can be used to obtain an initial estimate of the albedo. Then, k-means clustering can be used on this albedo to group pixels into clusters of the same albedo. These clusters can then be used to estimate both the true surface normals and albedos.

FIG. 5A is an image of a sphere painted with twenty-five different albedos and illuminated by separate red, green and blue light sources. FIGS. 5C-5E show the results of using this technique to reconstruct the sphere from a single image and the intermediate results. For comparison, FIG. 5B illustrates skewed normals acquired using some standard photometric stereo techniques, and FIG. 5D illustrates resolved normals using an embodiment of the present invention. FIG. 5E illustrates the reconstructed geometry of the sphere acquired from the normals of FIG. 5D.

FIG. 6A is an image of a painted owl figure. FIGS. 6C-6E show the results of using the above-described technique the intermediate results: a Retinex albedo (FIG. 6C), the albedo clusters (FIG. 6D), and the final surface normals (FIG. 6E). For comparison, FIG. 6B illustrates skewed normals acquired using some standard photometric stereo techniques.

As the above-described approach is a nonlinear optimization, it can get stuck in local minima if the initialization is far away from the correct solution. Therefore, according to an embodiment, the space of all possible albedos can be randomly sampled multiple times and the final result with the lowest error can be selected. Alternatively, the albedos can be initialized using the result from the intrinsic images decomposition. This approach delivers correct results, as long as none of the color channels is missing completely. This is illustrated, for example, in FIG. 6E, where parts of the owl are missing one or two color channels.

Example Results for Images with Missing Albedos

The greatest sources of errors in photometric stereo are shadows or where the albedo of the surface is missing a color channel (such as shown in FIG. 6E). Both these cases are effectively identical to missing a light source for the corresponding image pixels. Missing one light source means that the linear system for the normal is under-constrained and an infinite amount of solutions are possible. However, because of the remaining two light sources, the space of solutions is restricted to a single line in three-dimensional space. According to an example embodiment, the correct normal can be calculated by measuring the distance to the line. If the boundaries of the region in which a color channel is missing are well-defined, it is possible to inpaint (e.g., insert) the missing shading for one image and then calculate the surface normals. If, for example, the third of the three separate grayscale images (as derived from the single input image) contains a shadow ($I=(c1,c2,0)^T$, i.e., the zero value represents a shadow), the third value can be inpainted. Let the third value be represented by the parameter $\mu$:

$$n = L^{-1}R^{-1}I + L^{-1}R^{-1}\mu \begin{bmatrix} 0 \\ 0 \\ 1 \end{bmatrix}$$

Let $m_i$ be the ith column of $L^{-1}$ written as a function $f$.

$$n = f(R^{-1}, \mu) = s_1 c_1 m_1 + s_2 c_2 m_2 + s_3 \mu m_3$$

For a smooth surface, as well as smoothness in the missing shading, Equation (6) can be modified as follows:

$$\operatorname*{argmin}_{\mathcal{R}} \sum_{n_x \in \mathcal{N}} E(f(R_{n_x}^{-1}, \mu)) + (1 - \|f(R_{n_x}^{-1}, \mu)\|)^2 + \|\nabla \mu\| \qquad (7)$$

The final set of albedos and normals can be optimized with a global, nonlinear optimization. FIG. 7A is an image of a sphere. FIG. 7B shows the areas of missing data (e.g., missing colors) in the image of the sphere. Using a simple color thresholding or segmentation technique (e.g., by converting each of the separated RGB grayscale images into binary images based on a threshold value), the color shown in FIG. 7B indicates the missing color (e.g., red means that the red color channel data is missing). FIG. 7C shows the skewed normals acquired using some standard photometric stereo techniques. FIGS. 7D and 7E shows the results of using the above equation to reconstruct the geometry of a synthetic sphere with missing colors, in accordance with an embodiment. Despite the missing data, smooth surface normals are recoverable (FIG. 7E).

Example Computing Device

Figure 8:
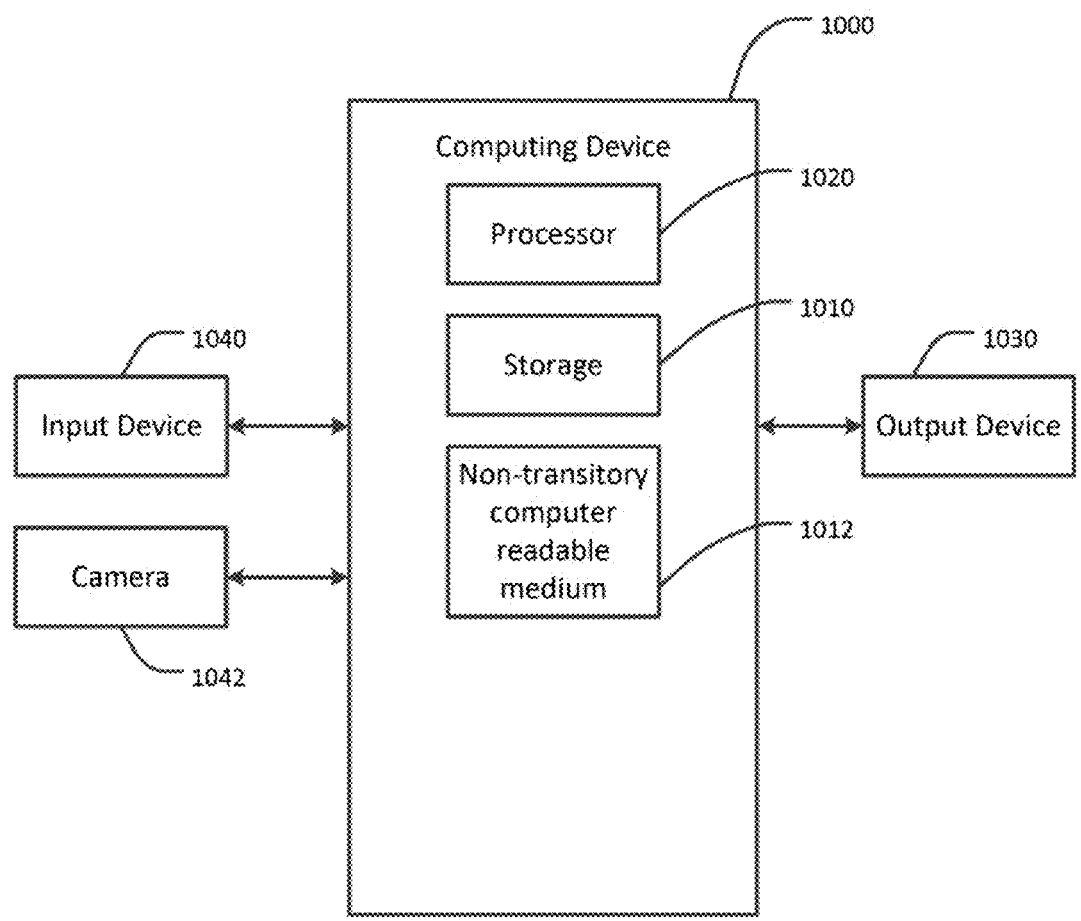
FIG. 8 is a block diagram representing an example computing device that can be used in conjunction with an embodiment of the present invention.

FIG. 8 is a block diagram representing an example computing device 1000 that may be used to perform any of the techniques as variously described herein. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010, non-transitory computer-readable media 1012, or both having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions, software, or both that implement various embodiments as taught herein. The storage devices 1010 may include other types of memory as well, or combinations thereof. The storage devices 1010 may be provided on the computing device 1000 or provided separately or remotely from the computing device. The non-transitory computer-readable media 1012 may include, but are not limited to, one or more types of hardware memory, non-transitory tangible media (for example, one or more magnetic storage disks, one or more optical disks, one or more USB flash drives), and the like. The non-transitory computer-readable media 1012 included in the computing device may store computer-readable and computer-executable instructions or software for implementing various embodiments. The computer-readable media 1012 may be provided on the computing device 1000 or provided separately or remotely from the computing device.

The computing device 1000 also includes at least one processor 1020 for executing computer-readable and computer-executable instructions or software stored in the storage device 1010, non-transitory computer-readable media 1012, or both and other programs for controlling system hardware. Virtualization may be employed in the computing device 1000 so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1030, such as a screen or monitor, which may display one or more user interfaces provided in accordance with some embodiments. The output device 1030 may also display other aspects, elements, information or data associated with some embodiments. The computing device 1000 may include other I/O devices 1040 for receiving input from a user, for example, a keyboard or any suitable multi-point touch interface, a pointing device (e.g., a mouse, a user's finger interfacing directly with a display device, etc.). The computing device may include other suitable conventional I/O peripherals. The computing device can include or be operatively coupled to various devices such as a camera 1042 or other suitable devices for performing one or more of the functions as variously described herein. The computing device can include the photometric stereo module 132 of FIG. 1 configured to receive an image from the camera 1042 and to reconstruct the geometry of an object appearing in the image.

The computing device 1000 may run any operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the photometric stereo module 132, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors, databases, or both in different configurations and arrangements, and that the depicted embodiments are not intended to be limiting. Various components of this example embodiment, including the user computing system, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment of the invention provides a computer-implemented method. The method includes receiving a single input image of an object illuminated by at least three differently colored light sources, the object having a non-white surface, a multi-colored surface, or both; separating the single input image into a plurality of grayscale images each corresponding to a color channel associated with one of the differently colored light sources; calculating a single constant albedo and normal vectors with respect to a surface of the object based on an intensity of pixels and light direction in each of the separate grayscale images; and determining a surface geometry of the object based on the calculated albedo and normal vectors. In some cases, the method includes dividing the pixels in each of the separate grayscale images into at least one cluster of pixels having a substantially constant albedo, wherein the calculating of the single constant albedo and the normal vectors is based on the intensity of the at least one cluster of pixels. In some cases, the color channels include red, green and blue. In some cases, the determining of the surface geometry is constrained by a surface integrability constraint. In some such cases, the surface integrability constraint can be expressed by the following equation:

$$\frac{\partial}{\partial x}\left(\frac{n_2}{n_3}\right) = \frac{\partial}{\partial y}\left(\frac{n_1}{n_3}\right)$$

where x and y represent pixel coordinate axes, and where $n_1$, $n_2$ and $n_3$ together represent the three-dimensional surface normal vectors, respectively. In some cases, a region of the single input image is missing light from one of the differently colored light sources, and the method includes inpainting the missing light into the region. In some cases, the method includes displaying, via a display device, a graphical representation of the surface of the object based on the surface geometry. In some cases, some or all of the functions variously described in this paragraph can be performed in any order and at any time by one or more different processors.

Another example embodiment provides a system including a storage having at least one memory, and one or more processors each operatively coupled to the storage. The one or more processors are configured to perform one or more of the functions defined in the present disclosure, such as the methodologies variously described in the preceding paragraph. Another embodiment provides a non-transient computer-readable medium or computer program product having instructions encoded thereon that when executed by one or more processors cause the processor to perform one or more of the functions defined in the present disclosure, such as the methodologies variously described in the preceding paragraph.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A computer-implemented method comprising:
receiving a single input image of an object illuminated by at least three differently colored light sources, the object having at least one of a non-white surface and a multicolored surface;
separating the single input image into a plurality of grayscale images each corresponding to a color channel associated with one of the differently colored light sources;
calculating a first single constant albedo and normal vectors with respect to the surface of the object based on an intensity of pixels and light direction in a first cluster of pixels having a first substantially constant albedo in at least one of the separate grayscale images;
calculating a second single constant albedo and normal vectors with respect to the surface of the object based on an intensity of pixels and light direction in a second cluster of pixels having a second substantially constant albedo in at least one of the separate grayscale images; and
determining a surface geometry of the object as a function of:
the first single constant albedo and the corresponding normal vectors, and
the second single constant albedo and the corresponding normal vectors.

2. The method of claim 1, wherein the color channels include red, green and blue.

3. The method of claim 1, wherein the determining of the surface geometry is constrained by a surface integrability constraint.

4. The method of claim 3, wherein the surface integrability constraint is expressed by the following equation:

$$\frac{\partial}{\partial x}\left(\frac{n_2}{n_3}\right) = \frac{\partial}{\partial y}\left(\frac{n_1}{n_3}\right)$$

wherein x and y represent pixel coordinate axes, and wherein $n_1$, $n_2$ and $n_3$ together represent the three-dimensional surface normal vectors, respectively.

5. The method of claim 1, wherein a region of the single input image is missing light from one of the differently colored light sources, and wherein the method further includes inpainting the missing light into the region.

6. The method of claim 1, further comprising displaying, via a display device, a graphical representation of the surface of the object based on the surface geometry.

7. An image processing system, comprising:
a storage comprising at least one memory; and
one or more processors each operatively coupled to the storage, the one or more processors configured to carry out a process comprising:
receiving a single input image of an object illuminated by at least three differently colored light sources, the object having at least one of a non-white surface and a multicolored surface;
separating the single input image into a plurality of grayscale images each corresponding to a color channel associated with one of the differently colored light sources;
calculating a first single constant albedo and normal vectors with respect to the surface of the object based on an intensity of pixels and light direction in a first cluster of pixels having a first substantially constant albedo in at least one of the separate grayscale images;
calculating a second single constant albedo and normal vectors with respect to the surface of the object based on an intensity of pixels and light direction in a second cluster of pixels having a second substantially constant albedo in at least one of the separate grayscale images; and
determining a surface geometry of the object as a function of:
the first single constant albedo and the corresponding normal vectors, and
the second single constant albedo and the corresponding normal vectors.

8. The system of claim 7, further comprising red, green and blue light sources for illuminating the object from different directions.

9. The system of claim 7, wherein the determining of the surface geometry is constrained by a surface integrability constraint.

10. The system of claim 9, wherein the surface integrability constraint is expressed by the following equation:

$$\frac{\partial}{\partial x}\left(\frac{n_2}{n_3}\right) = \frac{\partial}{\partial y}\left(\frac{n_1}{n_3}\right)$$

wherein x and y represent pixel coordinate axes, and wherein $n_1$, $n_2$ and $n_3$ together represent the three-dimensional surface normal vectors, respectively.

11. The system of claim 7, wherein a region of the single input image is missing light from one of the differently colored light sources, and wherein the process includes inpainting the missing light into the region.

12. The system of claim 7, further comprising a display device operatively coupled to the processor, wherein the process includes displaying, via a display device, a graphical representation of the surface of the object based on the surface geometry.

13. A non-transitory computer readable medium having instructions encoded thereon that when executed by one or more processors cause a process to be carried out, the process comprising:

receiving a single input image of an object illuminated by at least three differently colored light sources, the object having at least one of a non-white surface and a multi-colored surface;

separating the single input image into a plurality of grayscale images each corresponding to a color channel associated with one of the differently colored light sources;

calculating a first single constant albedo and normal vectors with respect to the surface of the object based on an intensity of pixels and light direction in a first cluster of pixels having a first substantially constant albedo in at least one of the separate grayscale images;

calculating a second single constant albedo and normal vectors with respect to the surface of the object based on an intensity of pixels and light direction in a second cluster of pixels having a second substantially constant albedo in at least one of the separate grayscale images; and determining a surface geometry of the object as a function of:
  the first single constant albedo and the corresponding normal vectors, and
  the second single constant albedo and the corresponding normal vectors.

14. The non-transitory computer readable medium of claim 13, wherein the color channels include red, green and blue.

15. The non-transitory computer readable medium of claim 13, wherein the determining of the surface geometry is constrained by a surface integrability constraint.

16. The non-transitory computer readable medium of claim 15, wherein the surface integrability constraint is expressed by the following equation:

$$\frac{\partial}{\partial x}\left(\frac{n_2}{n_3}\right) = \frac{\partial}{\partial y}\left(\frac{n_1}{n_3}\right)$$

wherein x and y represent pixel coordinate axes, and wherein $n_1$, $n_2$ and $n_3$ together represent the three-dimensional surface normal vectors, respectively.

17. The non-transitory computer readable medium of claim 13, wherein a region of the single input image is missing light from one of the differently colored light sources, and wherein the process includes inpainting the missing light into the region.

* * * * *